(12) United States Patent
Kheil

(10) Patent No.: US 9,809,137 B2
(45) Date of Patent: Nov. 7, 2017

(54) SECURING COVERS OVER FOAM CUSHIONS

(71) Applicant: Velcro BVBA, Deinze (BE)

(72) Inventor: Victor Horst Kheil, Kitchener (CA)

(73) Assignee: Velcro BVBA (BE)

( * ) Notice: Subject to any disclaimer, the term of this patent is extended or adjusted under 35 U.S.C. 154(b) by 31 days.

(21) Appl. No.: 14/774,477

(22) PCT Filed: Mar. 10, 2014

(86) PCT No.: PCT/EP2014/054554
§ 371 (c)(1),
(2) Date: Sep. 10, 2015

(87) PCT Pub. No.: WO2014/139933
PCT Pub. Date: Sep. 18, 2014

(65) Prior Publication Data
US 2016/0023581 A1 Jan. 28, 2016

Related U.S. Application Data

(60) Provisional application No. 61/779,620, filed on Mar. 13, 2013.

(51) Int. Cl.
B60N 2/58 (2006.01)
B29C 43/22 (2006.01)
B29C 43/46 (2006.01)

(52) U.S. Cl.
CPC ......... B60N 2/5825 (2013.01); B60N 2/5841 (2013.01); B60N 2/5891 (2013.01);
(Continued)

(58) Field of Classification Search
CPC ... B60N 2/5825; B60N 2/5841; Y10T 24/309; Y10T 24/44017
(Continued)

(56) References Cited

U.S. PATENT DOCUMENTS 5,733,001 A 3/1998 Roberts
7,506,939 B2 3/2009 Brockschneider et al.
(Continued)

FOREIGN PATENT DOCUMENTS

DE 10130250 C2 12/2003
FR 2777879 B1 1/2002
WO WO2011058415 A1 5/2011

OTHER PUBLICATIONS

International Preliminary Report on Patentability for International Application No. PCT/EP2014/054554 dated Sep. 24, 2015 (7 pp).

Primary Examiner — Adriana Figueroa
(74) Attorney, Agent, or Firm — Fish & Richardson P.C.

(57) ABSTRACT

A covered foam cushion (10), such as for an automotive seat, has a foam bun (12) with a contoured outer surface defining an elongated trench (16) between opposing side walls (18, 20). A retainer (28, 28a) is permanently secured to the foam bun and recessed within the trench between the side walls. A cover (14) extends over at least a portion of the foam bun and is held in place by a clip (26, 26a) permanently secured to a distal edge of a flange (24) of the cover within the trench of the foam bun. The clip is fastened to the retainer and has lateral protrusions (30, 30a) that bear against the opposing side walls of the trench.

17 Claims, 15 Drawing Sheets

(52) U.S. Cl.
CPC ............ *B29C 43/222* (2013.01); *B29C 43/46* (2013.01); *B29C 2043/461* (2013.01)

(58) Field of Classification Search
USPC ................... 297/218.1, 218.2, 218.3, 218.5
See application file for complete search history.

(56) References Cited

U.S. PATENT DOCUMENTS

| | | | |
|---|---|---|---|
| 7,752,720 B2* | 7/2010 | Smith ................... | B60N 2/5825 24/297 |
| 8,191,971 B2* | 6/2012 | Lovasz ................ | B60N 2/5825 297/452.59 |
| 8,197,010 B2 | 6/2012 | Galbreath et al. | |
| 9,180,804 B2* | 11/2015 | Tsunoda ............... | B60N 2/5825 |
| 2002/0101109 A1 | 8/2002 | Stiller et al. | |
| 2003/0162008 A1 | 8/2003 | Cappucci et al. | |
| 2010/0060051 A1* | 3/2010 | Poulakis ............ | B64D 11/0647 297/218.2 |
| 2011/0309667 A1 | 12/2011 | Stiller et al. | |
| 2012/0100342 A1 | 4/2012 | Schaefer | |
| 2012/0216376 A1 | 8/2012 | Galbreath et al. | |
| 2012/0240364 A1 | 9/2012 | Voigt | |

\* cited by examiner

SECURING COVERS OVER FOAM CUSHIONS

CROSS REFERENCE TO RELATED APPLICATIONS

This application is a §371 National Stage Application of International Application No. PCT/EP2014/054554, filed Mar. 10, 2014, which claims priority to U.S. Provisional Application No. 61/779,620, filed Mar. 13, 2013, each of which is incorporated herein by reference in its entirety.

TECHNICAL FIELD

This invention relates to securing covers over foam cushions.

BACKGROUND

Seats for cars and light trucks have been formed by molding a foam bun that will serve as the seat cushion, and then attaching a pre-stitched fabric cover to the foam bun. Often, when the fabric cover is to be held securely to the foam bun along a bun contour, discrete retainers such as hog rings are employed to connect a fabric flange, extending from the inner surface of the cover, to a wire retained at the bottom of a corresponding trench in the foam bun surface. Tension in the cover flange holds the cover against the bun in the contour. Other fastening methods involve fastening a clip, secured in the trench, to a bead along the flange edge.

Some fastening methods can be very labor-intensive, and can require significant manual dexterity. Some also require pneumatic tools for repetitive installations, due to the force required.

Improvements in the methods of attaching covers to contoured foam products are sought, either for contoured foam seat cushions or other applications.

SUMMARY

The invention features a cover retention system and method in which a clip on the underside of a cover is pressed to engage a retainer secured at the bottom of a foam trench. The clip features protrusions, such as in the form of wings, which engage the walls of the trench.

One aspect of the invention features a method of securing a cover over a foam cushion. The method includes placing a cover adjacent a foam cushion defining a trench in a surface of the cushion, the cushion having a recessed retainer secured at the bottom of the trench between opposing side walls of the trench, and pushing a flange of the cover into the trench. The flange has a distal edge with a retainer clip configured to fasten onto the retainer, thereby securing the cover onto the cushion. The clip has laterally-projecting protrusions that engage the side walls of the trench with the clip fastened onto the retainer.

In some embodiments, the clip is at least as wide as the trench and engages the opposing side walls of the trench as the cover flange is pushed into the trench and before the clip fastens onto the retainer. In some cases the clip is wider, as measured between distal ends of the lateral protrusions, than the trench at a point where the protrusions engage the side walls with the clip fastened, such that the clip compresses foam of the trench side walls.

Some examples of the clip have a series of discrete clip segments spaced apart longitudinally along the flange, and pushing the flange into the trench includes sequentially fastening the clip segments onto the retainer.

In some cases the protrusions extend to distal ends that are directed away from the bottom of the trench.

As the flange is pushed into the trench, the protrusions may engage the side walls of the trench and position the clip for engagement with the retainer.

In some applications the opposing side walls are parallel.

In some cases the protrusions comprise wings extending from inboard pivots to outer surfaces that engage the side walls. With the clip fastened onto the retainer and the outer surfaces engaging the trench side walls, in some examples the inboard pivots are disposed deeper in the trench than are the outer surfaces. When the clip is wider than the trench, pushing the flange into the trench may involve flexing the clip at the inboard pivots. Each wing may be connected outboard of its inboard pivot to a corresponding cam surface of the clip. When the clip is wider than the trench, pushing the flange into the trench may flex the clip at the inboard pivots and separate the cam surfaces. With the clip fastened onto the retainer and the outer surfaces engaging the trench side walls, the inboard pivots may be advantageously disposed deeper in the trench than are the outer surfaces, such that pulling the clip out of the trench by the cover flange causes the wings to extend and increases an overall width of the clip.

Another aspect of the invention features a covered foam cushion. The cushion includes a foam bun having a contoured outer surface defining an elongated trench between opposing side walls, a retainer permanently secured to the foam bun and recessed within the trench between the side walls, and a cover extending over at least a portion of the foam bun. The cover is secured in place by a clip permanently secured to a distal edge of a flange of the cover within the trench of the foam bun. The clip is fastened to the retainer and has lateral protrusions that bear against the opposing side walls of the trench.

In some covered foam cushions the retainer is in the form of an insert molded into foam of the foam bun.

In some cases the retainer has a head defining an overhang on two opposite sides of the head, and the clip has cam surfaces that extend into the overhang, with a distance between the cam surfaces being less than a width of the head. Preferably, the width of the head is less than about 50 percent of an overall width of the trench at an elevation of the head.

In some embodiments the retainer has guide walls on either side of the head, the flanges extending toward an opening of the trench. The guide walls may be angled with respect to an insertion direction of the flange and positioned to inhibit release of the clip from the retainer.

In some examples the head features a series of spaced apart head segments along the retainer, and the retainer is held in a curved position along the trench.

The clip may be molded onto the edge of the cover flange.

In some configurations the clip features a longitudinally continuous spine secured along the edge of the flange.

The clip, in some examples, has a series of discrete clip segments spaced apart longitudinally along the flange. For some applications, the clip segments may be spaced sufficiently to allow the flange to be bent to follow a trench defining a curvature radius of less than about 50 mm.

In some embodiments the clip has opposing cam surfaces disposed beneath a head of the retainer. The cam surfaces may each comprise a longitudinal series of discrete, spaced apart cam surface segments.

The protrusions of the clip may be in the form of wings extending from inboard pivots to outer surfaces that engage the opposing side walls. The inboard pivots may be advantageously disposed deeper in the trench than are the outer surfaces. In some cases the clip is wider than the trench, such that foam of the trench side walls is held laterally compressed by the clip wings. Each wing may be connected outboard of its inboard pivot to a corresponding cam surface of the clip. The inboard pivots may be disposed deeper in the trench than are the outer surfaces.

The wings may each comprise a longitudinal series of discrete, spaced apart, separately manipulable wing segments.

Various examples of the invention may provide a number of useful advantages over some prior cover retention systems and methods. For example, the clip projections may serve to align the clip during insertion in the trench, and help resist pivoting of the clip on the retainer during use. The projections may also be configured in a manner that causes them to resist opening of the clip under tension of the cover flange. Furthermore, the clip may be configured to more readily enable removal from the retainer, in many cases without damage to the retention system, for removal or replacement of the cover. Removal may be required, for example, during rework at the assembly factory.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
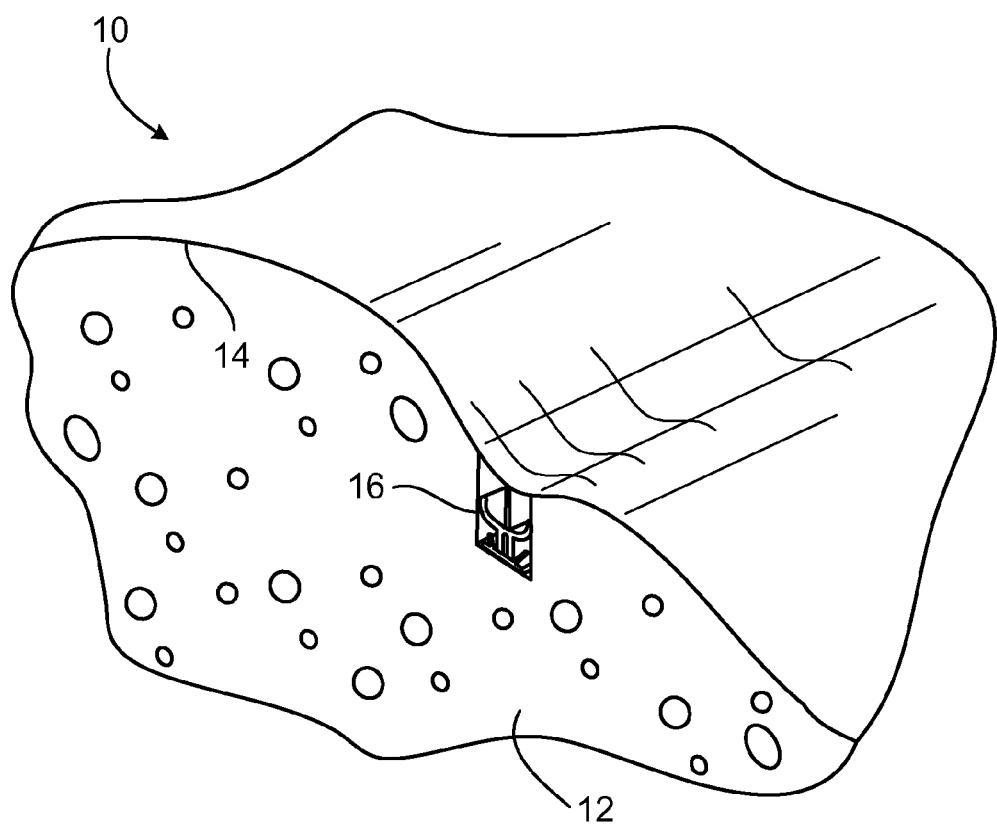
FIG. 1 is a partial cutaway view of a portion of a covered foam seat cushion.

Referring first to FIG. 1, a covered foam cushion 10 includes a foam bun 12 and a cover 14 extending over a contoured outer surface of the foam bun. The bun surface features an elongated trench 16 at which the cover is held in place. The trench is positioned with respect to the bun contour such that holding the cover tight against the bun at the trench helps to hold the cover tight against the rest of the contour of the foam bun. In this example, the foam cushion is of an automotive seat.

Figure 2:
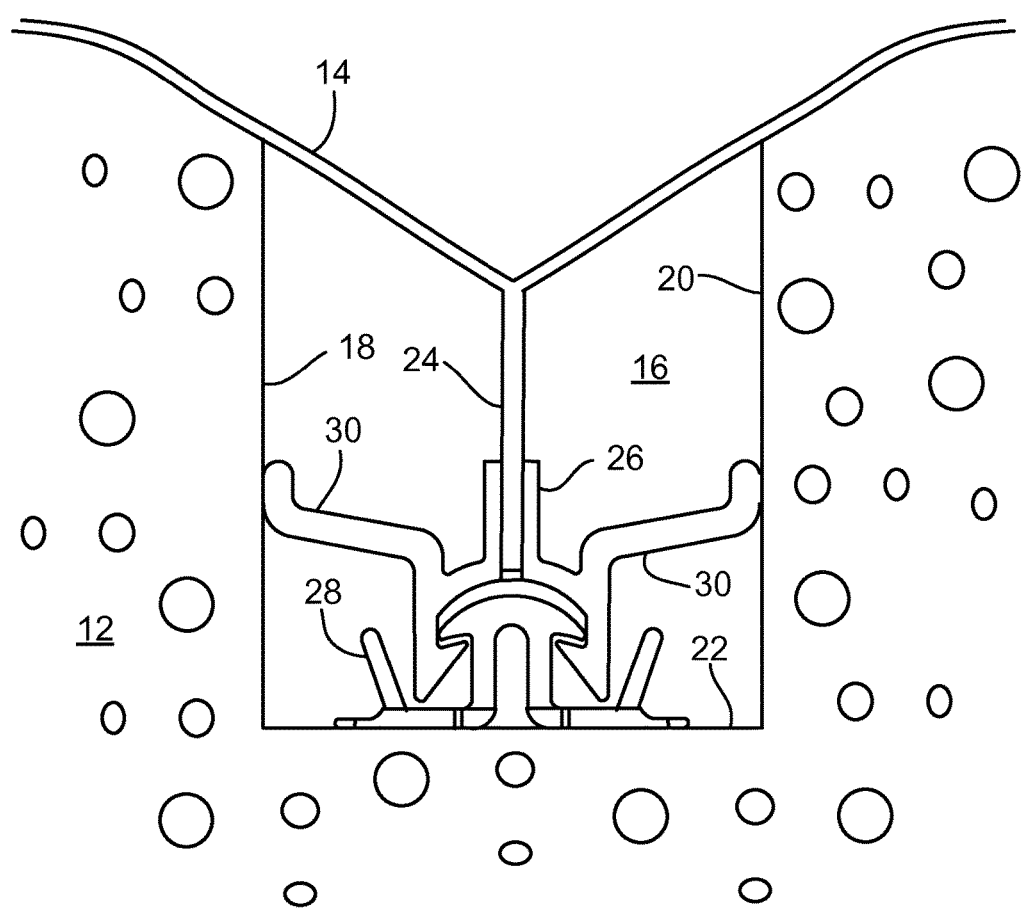
FIG. 2 is an end view of the trench in the seat cushion, showing the cover attachment.

Referring next to FIG. 2, trench 16 is defined between two opposing side walls 18 and 20, and above a trench bottom surface 22. In this example, the opposing side walls are parallel with each other and perpendicular to the trench bottom surface. However, other trench geometries are envisioned. As will be described in more detail below, cushion cover 14 is equipped with a flexible flange 24 extending down into the trench, and a clip 26 secured to the distal end of the flange. Clip 26 may be secured to flange 24 by any number of methods, including sewing. A mating retainer 28 is permanently secured to foam bun 12 at the trench bottom 22 and recessed within the trench between side walls 18, 20. While retainer 28 may be secured by any number of methods, one method understood in the art is to secure the retainer to the foam as the foam is formed, such as by insert-molding the retainer in place. Such methods are described, for example, in U.S. Pat. No. 7,971,325. The secured retainer may be, for example, partially embedded in foam of the seat bun, and may include projections (not shown) extending below the surface of the foam. To aid in holding the retainer in place during foaming, the retainer may be magnetically attractable, such as by having a magnetically attractable wire (not shown) extending along its length.

Clip 26 features lateral protrusions 30 that bear against both opposing side walls 18, 20 of trench 16. Thus, clip 26 spans the entire width of the trench. In this example, the protrusions are in the form of wings of relatively greater lateral length than their thickness.

Figure 3:
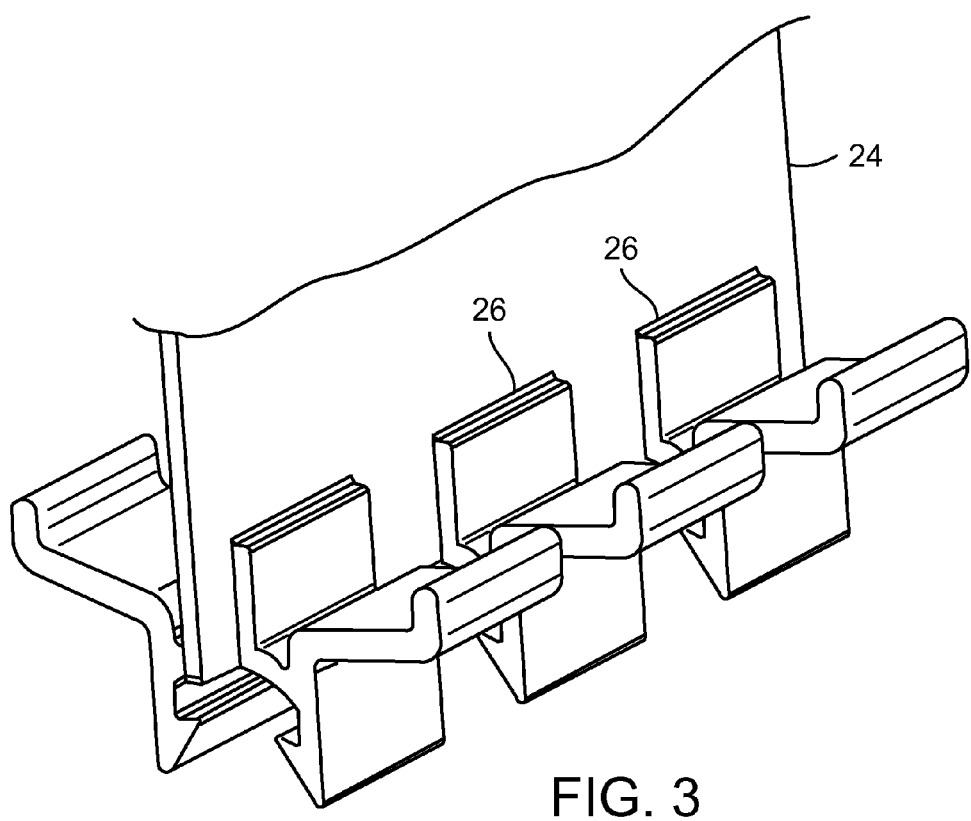
FIG. 3 is a perspective view of a portion of the flange of the cushion cover, showing the attachment clip.
Figure 4:
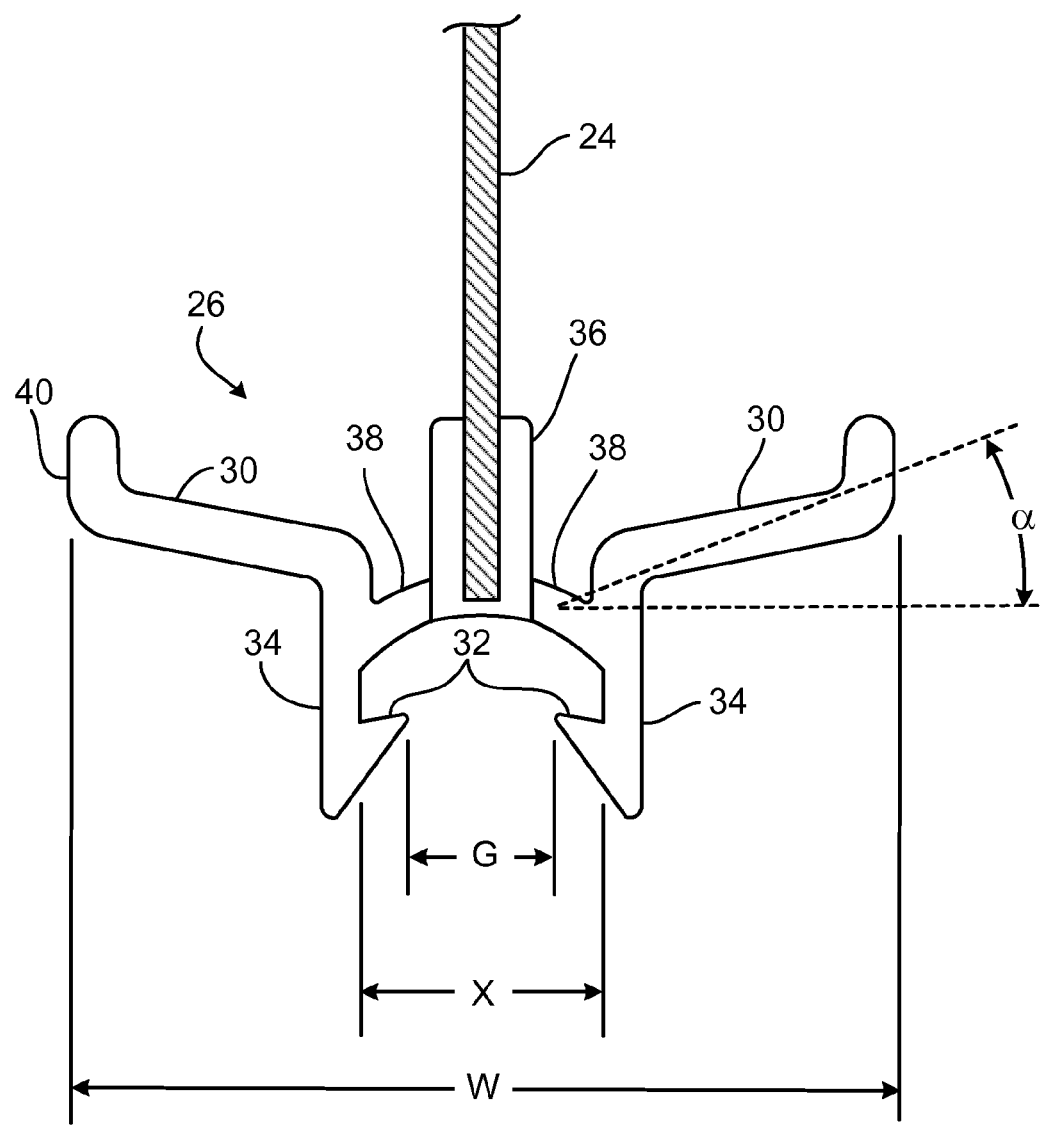
FIG. 4 is an end view of the flange portion of FIG. 3.

Referring also to FIG. 3, clip 26 is in this example a series of clip segments spaced along the length of flange 24. Each clip segment is of identical profile to the other segments, and together they form a longitudinal series of discrete, spaced apart cam surface segments. The spacing of the clip segments helps to maintain the flexibility of the flange, such as for following a curved trench. In the example dimensioned below, each clip has a longitudinal length of 6 mm, with a 4 mm gap between adjacent clips. The length of each clip is sufficient to permit manual manipulation. The ratio of clip length to gap (in this case, about 3:2) provides a reasonably continuous connection to provide a smooth seam line while maintaining flexibility. Preferably, the clips are arranged to provide at least one, and as many as three or more, discrete and separately engageable clips per centimeter of flange length. Preferably, the clip spacing is such that the flange can be readily bent to follow a trench curvature radius (about an axis perpendicular to the bottom surface of the trench and to the centerline of the trench) of less than about 50 mm. In the illustrated example, the flange can be bent to follow a trench curvature radius of about 21 mm before adjacent clip segments contact each other and inhibit further flexure. As shown in FIG. 4, clip 26 has two inwardly-directed cam surfaces 32, the opposing tips of which are separated by a distance G. These cam surfaces are of legs 34 that extend downward from the inner edges of the projections 30, with the legs separated by a distance X above the cam surfaces, with X being greater than G. Each projection-leg pair attached to a central spine 36 of the clip by a web 38 that forms a hinge point or fulcrum for the projection-leg pair with respect to the flange and spine, such that each projection 30 is connected outboard of its inboard hinge pivot to a corresponding cam surface 32 of the clip.

Thus, if the tip of a wing is forced upward, the tip of the corresponding cam surface 32 is displaced outward, flexing the web 38. Projections 30 bend upward at their outer ends, presenting wall engagement surfaces 40 that are essentially parallel to the trench walls, helping the clip to slide along the walls as it is pressed into place. The projections 30 extend such that engagement surfaces 40 are farther from the bottom of the trench, in use, than the hinge webs 38, such that a line between the center of the engagement surface and the functional centroid of the hinge web forms an angle α with respect to the bottom of the trench. The free (unloaded) width of the clip is shown as W. In one example clip dimensioned for use in a trench of width 16 to 17 mm, G is about 3 mm, X is about 5 mm, W is about 17 mm, α is about 22 degrees, the nominal wing thickness is about 1.0 mm, and the nominal thickness of webs 38 is about 0.8 mm.

Figure 5:
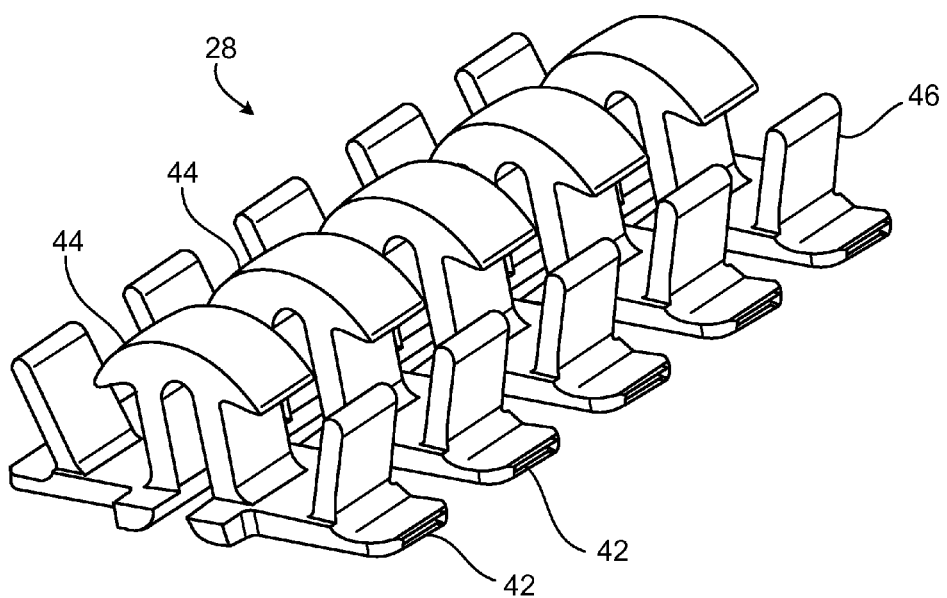
FIG. 5 is a perspective view of the retainer shown in FIG. 2.

Referring next to FIG. 5, retainer 28 is a series of interconnected retainer segments 42, each segment carrying a head segment 44 aligned along the length of the retainer. Each retainer segment is of an identical profile and features guide walls 46 on either side of the head segment. The guide walls extend upward toward the trench opening and have inner wall surfaces that are slanted, so as to guide the legs of an approaching clip into proper position to engage the head segment. The spaces between the retainer segments enable the elongated retainer to be bent along its length, so as to follow a curved trench.

Figure 6:
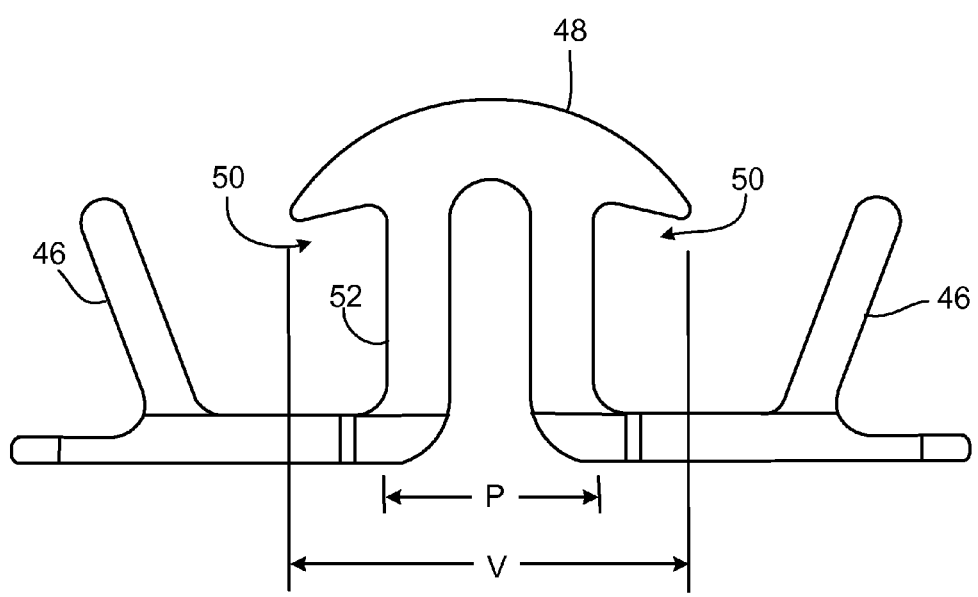
FIG. 6 is an end view of the retainer of FIG. 5.

Referring also to FIG. 6, each head segment has a head 48 defining an overhang 50 on two opposite sides of the head. Thus, the overall width V of the head is greater than the width P of the stem 52 on which the head is disposed. In order to retain the clip on the head, the head width V is also larger than the separation distance G between the opposing cam surface tips of the clip (see FIG. 4). In one example retainer dimensioned for use with the above-described clip, V is about 4.8 mm and P is about 2.6 mm, with the overall height of the retainer being about 4.5 mm. For many applications the width V of head 48 is less than about 50 percent of an overall width of the trench at an elevation of the head, with the retainer secured to the foam bun. As shown in FIG. 6, the head 48 and stem 52 together form a U open at the bottom of the retainer. A flexible magnetically attractable wire (not shown) may be inserted into the cavity bounded by this U, thereby providing a means of holding the retainer in place in a seat bun mold by magnetic attraction and further connecting the head segments.

Referring back to FIG. 2, then, with the clip 26 properly engaging the head of the retainer 28, the clip cam surfaces extend into the overhang under the head, with the distance G between the cam surfaces (FIG. 4) being less than the width V of the head (FIG. 6).

Figure 7:
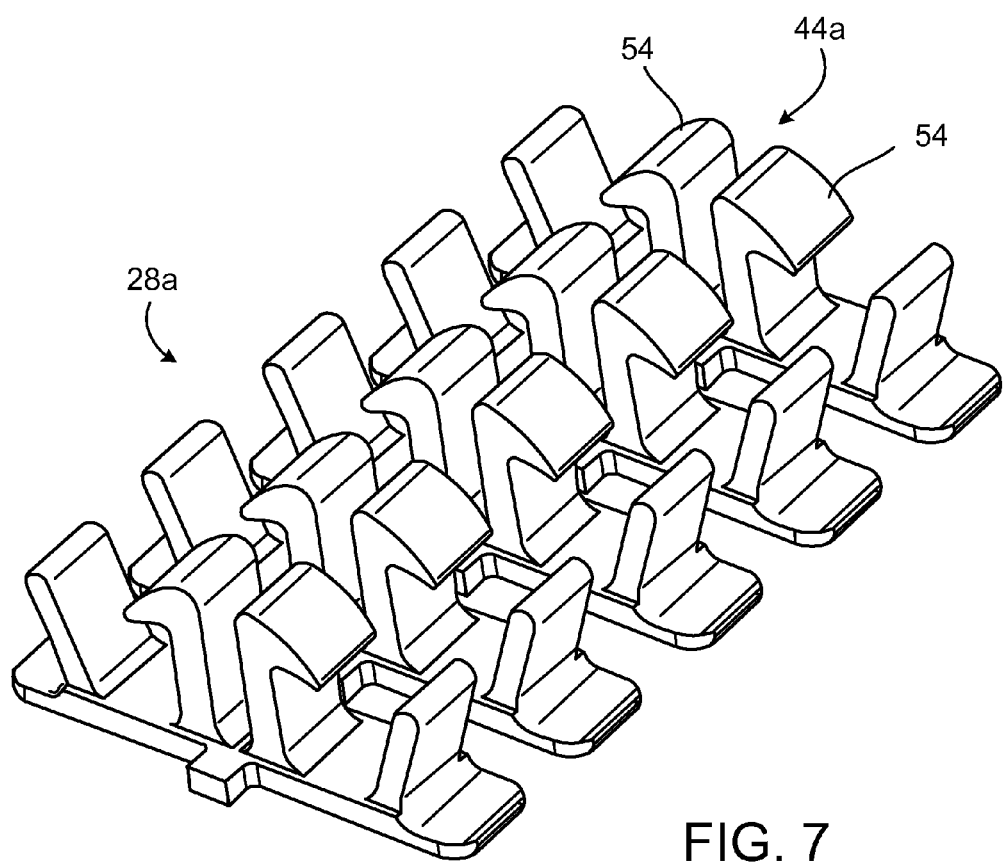
FIG. 7 is a perspective view of an alternate retainer.
Figure 8:
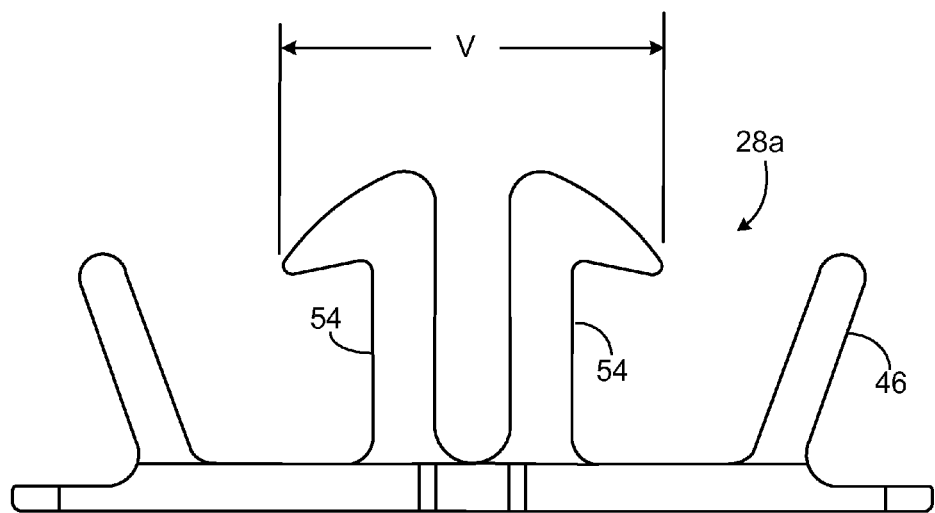
FIG. 8 is an end view of the retainer of FIG. 7.

Referring next to FIGS. 7 and 8, another example of a retainer 28a is similar to that described above with respect to FIG. 5, but with each head segment 44a formed as a pair of laterally directed, spaced apart hooks 54 extending upward from a continuous base. This head configuration allows for more flexure during engagement of the clip with the hook stems able to flex to reduce the effective width V of the head as it is engaged within the clip. Such a retainer may be combined with any of the clips discussed herein, to form an effective cover fastening.

Figure 9:
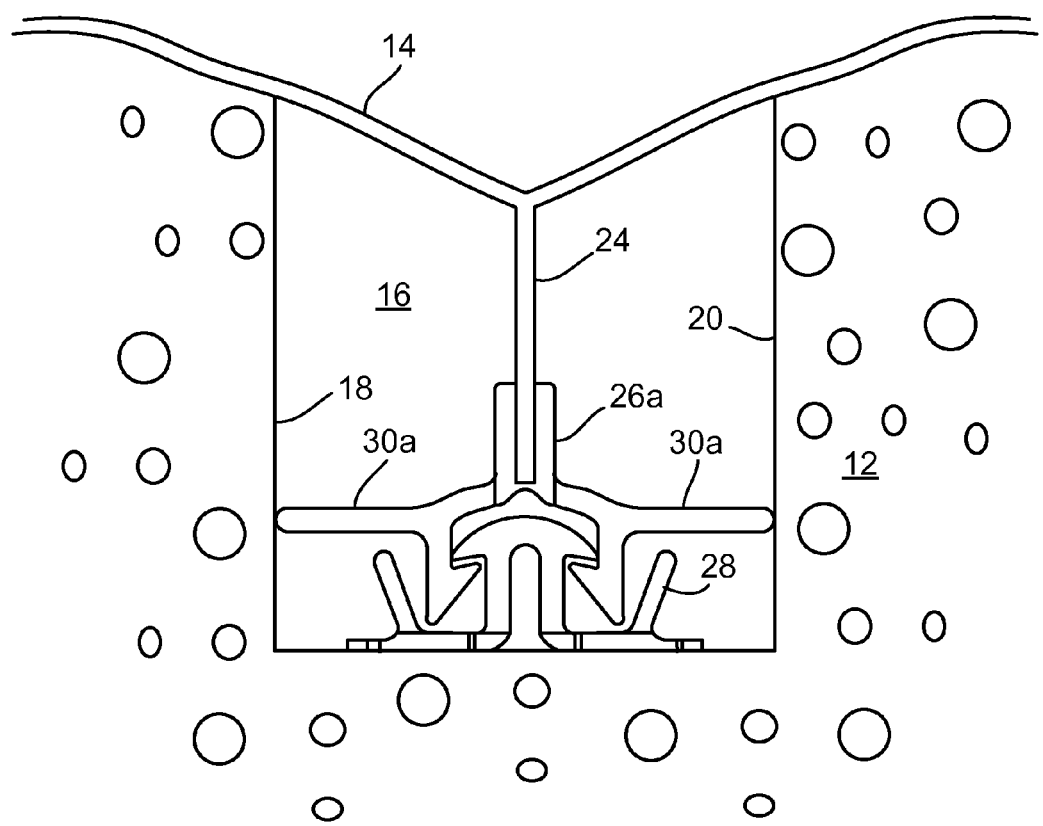
FIG. 9 is an end view of a cushion trench, showing a cover attached with an alternate clip.
Figure 10:
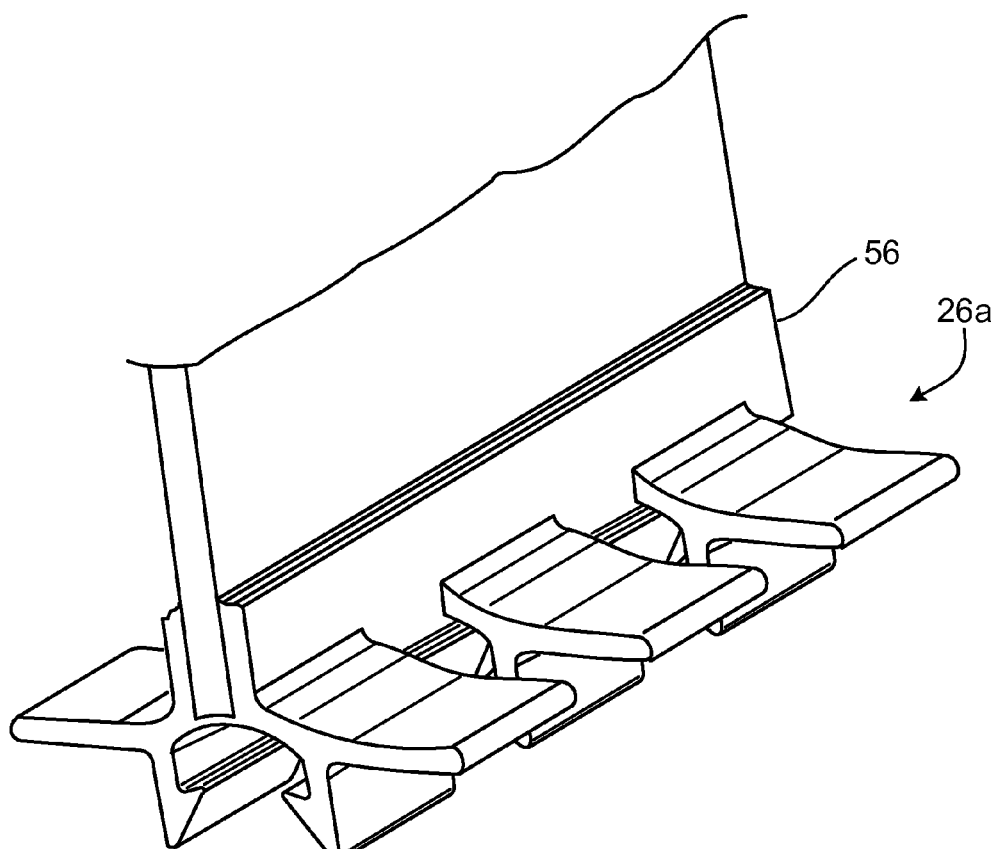
FIG. 10 is a perspective view of a portion of the flange of the cushion cover, showing the alternate clip of FIG. 9.
Figure 11:
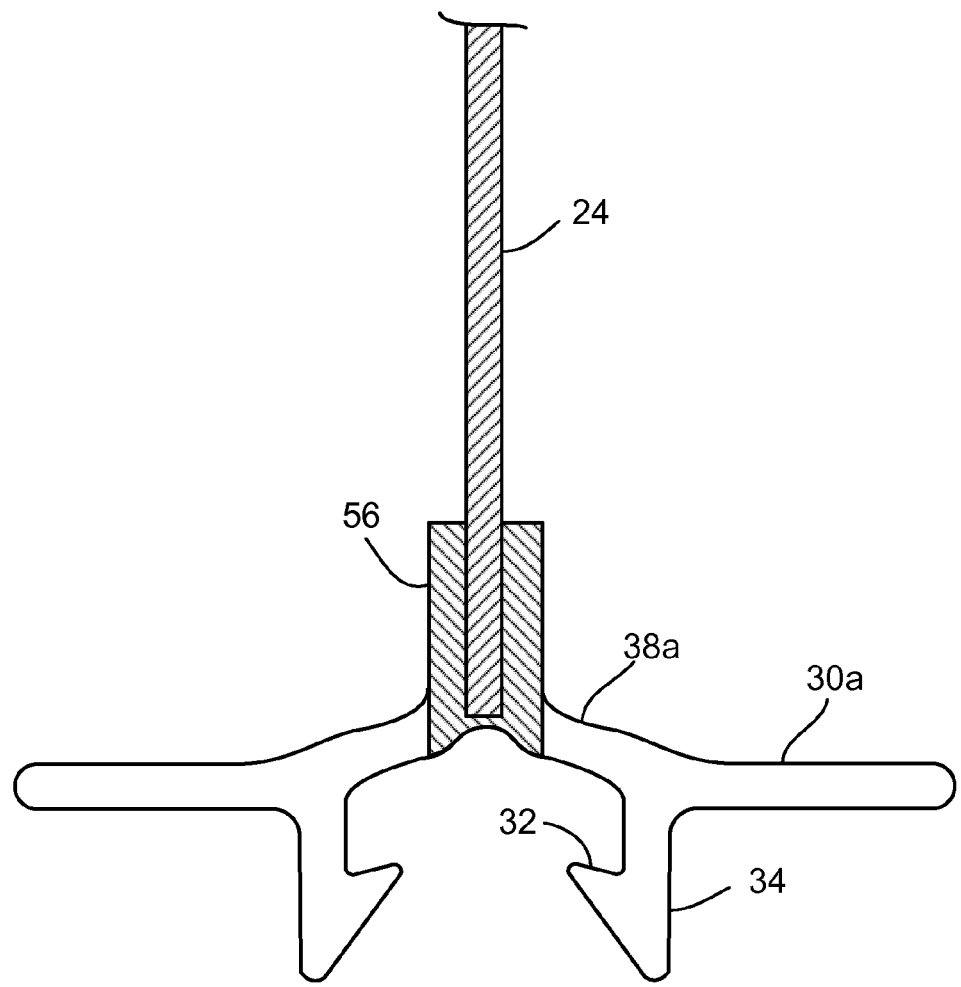
FIG. 11 is an end view of the alternate clip of FIG. 9.
Figure 12:
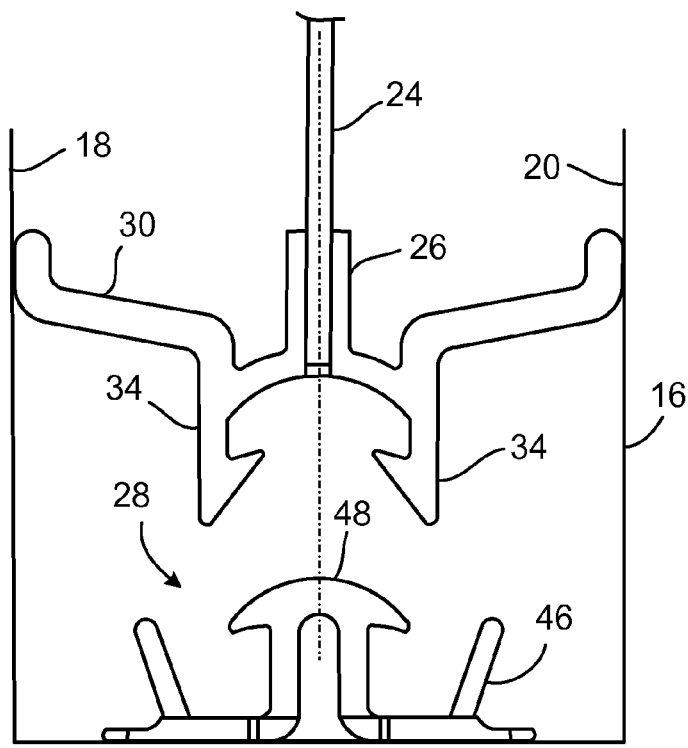
FIGS. 12-18 sequentially illustrate engagement of the clip with the retainer.

Referring next to FIG. 9, another example of a clip 26a has projections 30a in the form of wings that extend perpendicular to the cover flange 24, engaging the trench walls 18, 20 at narrow wing tips. Referring also to FIGS. 10 and 11, clip 26a has a longitudinally continuous spine 56 secured to a distal edge of flange 24, with a series of discrete, longitudinally spaced clip segments extending integrally from the spine and forming the projections 30a and legs 34. Clip 26a may be molded onto the edge of the flange, such as by overmolding a longitudinally continuous profile and then removing sections of the profile between adjacent segments. Each projection/leg combination is connected to the spine 56 by a corresponding web 38a that forms a flexible pivot point, such that as the wing tips are flexed upward the cam surfaces are separated.

Figure 13:
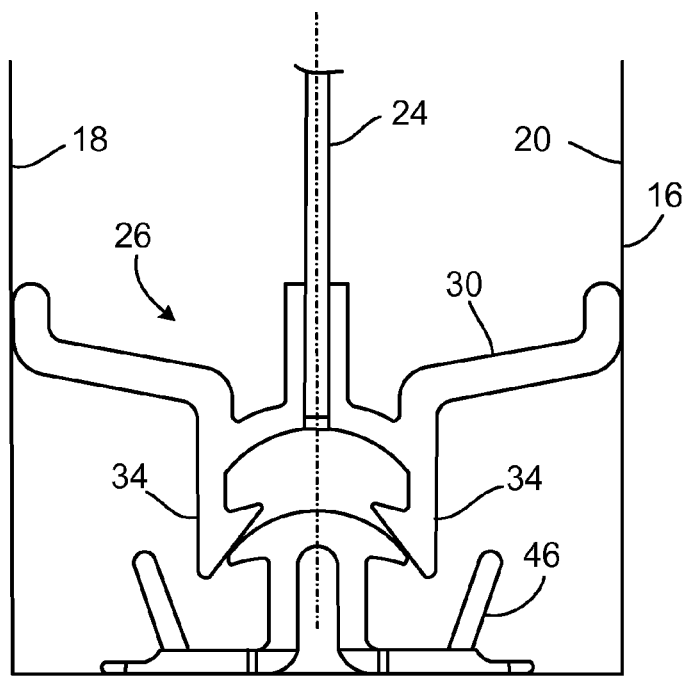
Figure 14:
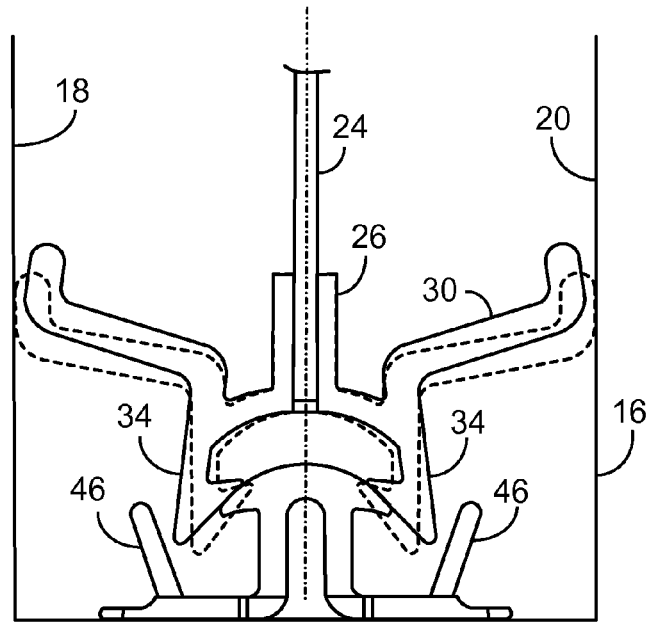
Figure 15:
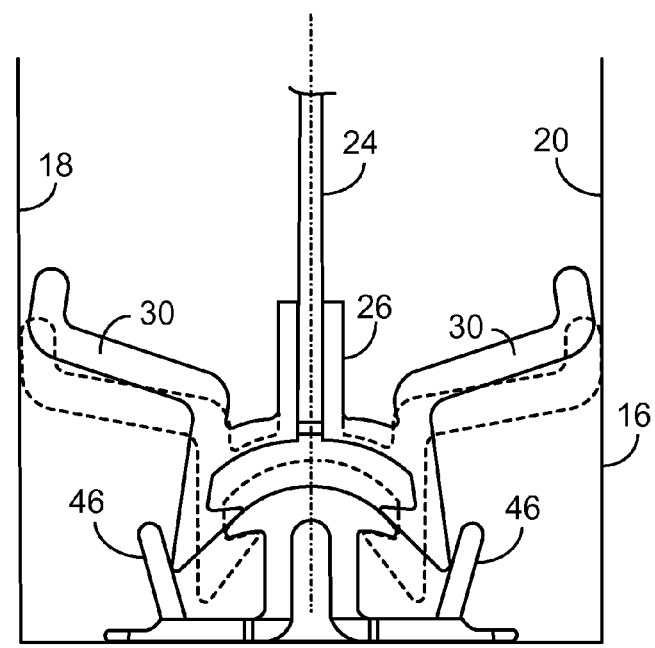
Figure 16:
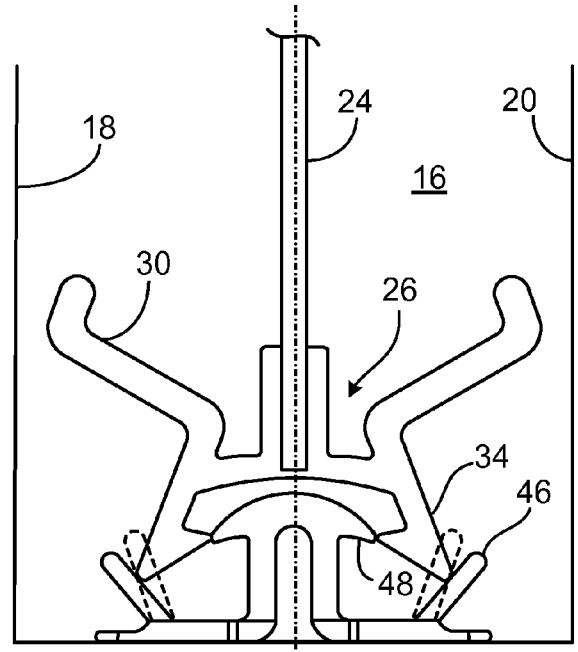
Figure 17:
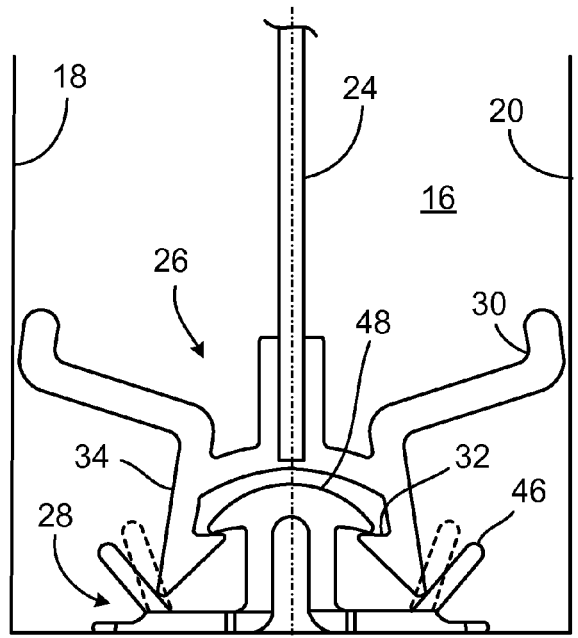
Figure 18:
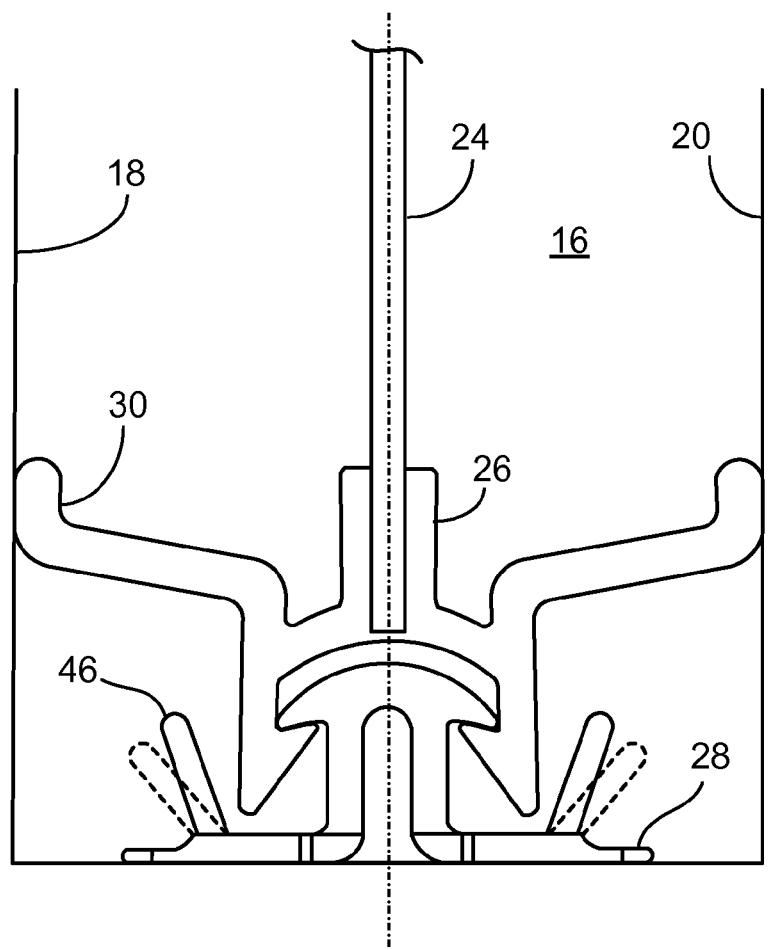

Referring next to FIGS. 12-18, as clip 26 is pressed into trench 16 (FIG. 12), the distal tips of projections 30 engage trench side walls 18,20 and center the clip within the width of the trench so as to place legs 34 on either side of the retainer head, such that the canted inner surfaces of legs 34 engage the opposite sides of the retainer head (FIG. 13). Upon a further application of pressure (such as manually applied by a worker), clip 26 begins to flex (FIG. 14) to open the clip to receive the head, and the tips of projections 30 may in some cases come out of contact with the trench side walls. As the clip further flexes (FIG. 15), the distal ends of legs 34 contact guide walls 46 of the retainer, further helping to maintain an aligned position of the clip on the retainer. This flexure may further raise projections 30 away from the trench walls. Manual pressure on the clip is preferably applied centrally to the spine, rather than at the projection tips, to better allow the clip to distend to snap over the retainer head. Further pressure begins to deflect retainer guide walls 46 outward (FIG. 16), as the clip opens a sufficient width to clear the retainer head. Eventually, the tips of the cam surfaces 32 of legs 34 snap below the underside of head 48 (FIG. 17) and the clip 26 and retainer 28 return to their unstressed conditions (FIG. 18), with the projections 30 of the clip again engaging the trench side walls. In many cases the clip is wider than the trench, such that foam of the trench side walls is held laterally compressed by projections 30. Residual tension in cover flange 24 tends to hold the clip against the underside of the retainer. Guide walls 18,20 are positioned such that, should the clip be moved laterally in the absence of flange tension during use (such as when someone is sitting on the seat at the seam), the ends of legs 34 contact the guide walls, thereby helping to prevent undesired release of the clip.

Removal of the cover from the seat bun may be accomplished in many applications by manually distending clip 26 to release the clip from retainer 28, by grasping the projections of the clip between the fingers across the width of the clip, and then pinching the clip to open the distance between clip legs 34, in essentially a reversal of the flexure sequence illustrated in FIGS. 12-18.

The various clips and retainers discussed above may be formed of a durable thermoplastic resin, and may be formed by molding or by extrusion. If formed longitudinally segmented, extrusion of a preform rail of the desired profile may be followed either by an appropriate cutting and longitudinal stretching operation to separate adjacent segments of the clip or retainer, or by removing sections of the rail along its length. The base of the retainer may be recessed within foam of the seat bun, even to a point where foam of the bottom of the trench is compressed by the ends of the clip legs in order to engage the head of the retainer. Such foam compression may further help to retain the clip on the retainer in use.

As illustrated in the figures, the overlapping surfaces of the clip and retainer (e.g., the upper side of the cam surfaces of the clip and the underside of the retainer head) feature complementary angles, such that pulling upward on the cover flange after engagement tends to prevent unintentional splaying of the clip legs. Furthermore, engagement of the ends of the clip projections against the trench side walls, particularly when such engagement is at an elevation higher than the clip flexure points, will tend to further prevent splaying of the clip as the clip is pulled upward against the trench side walls.

While a number of examples have been described for illustration purposes, the foregoing description is not intended to limit the scope of the invention, which is defined by the scope of the appended claims. There are and will be other examples and modifications within the scope of the following claims.

What is claimed is:

1. A method of securing a cover over a foam cushion, the method comprising:
    placing a cover adjacent a foam cushion defining a trench in a surface of the cushion, the cushion having a recessed retainer secured at the bottom of the trench between opposing side walls of the trench; and
    pushing a flange of the cover into the trench, the flange having a distal edge with a retainer clip configured to fasten onto the retainer, thereby securing the cover onto the cushion;
    wherein the clip has laterally-projecting protrusions that engage the side walls of the trench with the clip fastened onto the retainer;
    wherein the protrusions comprise wings extending from inboard pivots to outer surfaces that engage the side walls; and
    wherein each wing is connected outboard of its inboard pivot to a corresponding cam surface of the clip.

2. The method of claim 1, wherein the clip is at least as wide as the trench and engages the opposing side walls of the trench as the cover flange is pushed into the trench and before the clip fastens onto the retainer.

3. The method of claim 1, wherein the clip comprises a series of discrete clip segments spaced apart longitudinally along the flange, and wherein pushing the flange into the trench comprises sequentially fastening the clip segments onto the retainer.

4. The method of claim 1, wherein the protrusions extend to distal ends that are directed away from the bottom of the trench.

5. The method of claim 1, wherein, as the flange is pushed into the trench, the protrusions engage the side walls of the trench and position the clip for engagement with the retainer.

6. The method of claim 1, wherein with the clip fastened onto the retainer and the outer surfaces engaging the trench side walls, the inboard pivots are disposed deeper in the trench than are the outer surfaces.

7. The method of claim 2, wherein the clip is wider, as measured between distal ends of the lateral protrusions, than the trench at a point where the protrusions engage the side walls with the clip fastened, such that the clip compresses foam of the trench side walls.

8. The method of claim 1, wherein the opposing side walls are parallel.

9. The method of claim 1, wherein the clip is wider than the trench, such that pushing the flange into the trench comprises flexing the clip at the inboard pivots.

10. The method of claim 1, wherein the clip is wider than the trench, such that pushing the flange into the trench flexes the clip at the inboard pivots and separates the cam surfaces.

11. The method of claim 1, wherein with the clip fastened onto the retainer and the outer surfaces engaging the trench side walls, the inboard pivots are disposed deeper in the trench than are the outer surfaces, such that pulling the clip out of the trench by the cover flange causes the wings to extend and increases an overall width of the clip.

12. A covered foam cushion, comprising:
    a foam bun having a contoured outer surface defining an elongated trench between opposing side walls;
    a retainer permanently secured to the foam bun and recessed within the trench between the side walls; and
    a cover extending over at least a portion of the foam bun and secured in place by a clip molded onto a distal edge of a flange of the cover within the trench of the foam bun, the clip fastened to the retainer and having lateral protrusions that bear against the opposing side walls of the trench;
    wherein the protrusions of the clip comprise wings extending from inboard pivots to outer surfaces that engage the opposing side walls; and
    wherein each wing is connected outboard of its inboard pivot to a corresponding cam surface of the clip.

13. The covered foam cushion of claim 12, wherein the retainer has a head defining an overhang on two opposite sides of the head, and wherein the clip has cam surfaces that extend into the overhang, with a distance between the cam surfaces being less than a width of the head.

14. The covered foam cushion of claim 13, wherein the retainer has guide walls on either side of the head, the guide walls extending toward an opening of the trench.

15. The covered foam cushion of claim 13, wherein the head comprises a series of spaced apart head segments along the retainer, and wherein the retainer is held in a curved position along the trench.

16. The covered foam cushion of claim 12, wherein the clip comprises a longitudinally continuous spine secured along the edge of the flange.

17. The covered foam cushion of claim 12, wherein the inboard pivots are disposed deeper in the trench than are the outer surfaces.

* * * * *